United States Patent
Roberts

(10) Patent No.: US 10,843,417 B2
(45) Date of Patent: Nov. 24, 2020

(54) METHOD AND SYSTEM FOR RESIN INFUSING A COMPOSITE PREFORM

(71) Applicant: The Boeing Company, Chicago, IL (US)

(72) Inventor: Richard Roberts, Victoria (AU)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 15/591,794

(22) Filed: May 10, 2017

(65) Prior Publication Data
US 2017/0334150 A1 Nov. 23, 2017

(30) Foreign Application Priority Data
May 20, 2016 (AU) .................. 2016203289

(51) Int. Cl.
*B29C 70/44* (2006.01)
*B29C 70/54* (2006.01)
*B29K 105/08* (2006.01)

(52) U.S. Cl.
CPC .......... *B29C 70/443* (2013.01); *B29C 70/548* (2013.01); *B29K 2105/0872* (2013.01)

(58) Field of Classification Search
CPC ..... B29C 70/443; B29C 70/548; B29C 70/44; B29C 70/48
See application file for complete search history.

(56) References Cited

U.S. PATENT DOCUMENTS

| 4,942,013 A * | 7/1990 | Palmer ............... B29C 43/3642 156/285 |
| 5,256,366 A * | 10/1993 | Wejrock ............... B29C 70/443 264/101 |
| 2002/0020934 A1 | 2/2002 | Hinz |

(Continued)

FOREIGN PATENT DOCUMENTS

EP      2650096 A1      10/2013

OTHER PUBLICATIONS

Search Report for related European Application No. EP17171932.1; report dated Nov. 29, 2017.

*Primary Examiner* — Jeffrey M Wollschlager
*Assistant Examiner* — Armand Melendez
(74) *Attorney, Agent, or Firm* — Miller, Matthias & Hull LLP

(57) ABSTRACT

Resin infusing a composite preform includes locating the preform on an upper tool surface having a resin reservoir element on a downstream side of the composite preform. A vacuum bagging film is placed over the tool surface to cover the composite preform and the resin reservoir element, and is sealed relative to the tool surface to define a sealed resin infusion chamber. A resin supply is provided along with a resin flow path from the resin supply to the resin infusion chamber on an upstream side of the composite preform, through the composite preform and through the reservoir inlet to the resin reservoir. At least partial vacuum pressure applied to the reservoir outlet establishes a pressure differential between the resin supply and reservoir outlet to drive resin from the resin supply through the resin flow path, infusing the composite preform with resin and collecting excess resin in the resin reservoir.

20 Claims, 9 Drawing Sheets

(56) References Cited

U.S. PATENT DOCUMENTS

| | | | |
|---|---|---|---|
| 2005/0073076 A1* | 4/2005 | Woods | B29C 70/443 264/511 |
| 2006/0266472 A1* | 11/2006 | Kipp | B29C 70/44 156/286 |
| 2010/0186899 A1* | 7/2010 | Jackson | B29C 33/10 156/382 |
| 2011/0037199 A1* | 2/2011 | Young | B29C 70/443 264/258 |
| 2015/0336294 A1 | 11/2015 | Hanks et al. | |

* cited by examiner

METHOD AND SYSTEM FOR RESIN INFUSING A COMPOSITE PREFORM

FIELD

The present disclosure generally relates to the fabrication of composite structures and in particular relates to a method and system for resin infusing a composite preform.

BACKGROUND

A current method for fabricating composite structures utilises a resin infusion process to infuse a composite preform, formed of multiple plies formed of composite fibres, with resin prior to curing of the resin to form a composite structure. According to a current method, the composite preform is located on a tool surface and a vacuum bagging film is placed over the tool surface to cover the composite preform and sealed to form a sealed chamber between the tool surface and vacuum bagging film. Resin is infused through the composite preform by application of vacuum pressure to a downstream end of the sealed chamber, drawing resin from an upstream resin supply through the composite preform. Once the resin has been infused throughout the preform, the entire assembly is heated, typically in an oven, to cure the resin and thus form the composite structure.

Resin infuses through the composite preform with a wavefront that may or may not progress evenly across the lateral extent of the preform. It is important to ensure that the entire preform is infused, whilst avoiding resin that has passed through the preform in advanced areas of the wavefront from being drawn into the vacuum source. If resin is drawn into the vacuum source, there is a risk of damage to the vacuum source. The cost of removing cured resin from the vacuum source and associated vacuum piping between the tool and vacuum source, or replacing the vacuum source or piping, may also be prohibitive.

Various solutions to this problem have previously been proposed, with varying success in terms of effectiveness, finished product quality, retrofittability and cost.

The present disclosure is made bearing the above problem in mind.

SUMMARY

The present disclosure is generally directed to a method of resin infusing a composite preform and a resin infusion system for resin infusing a composite preform. According to embodiments of the present disclosure, a resin reservoir element is utilised to collect excess resin that has passed through the resin flow path beyond the composite preform, upstream of the vacuum source. The resin reservoir element is located on an upper tool surface of the tool on which the composite preform is located, defining a resin reservoir for collection of the excess resin.

According to one aspect, the present disclosure provides a method of resin infusing a composite preform. A composite preform is located on an upper tool surface of a tool. A resin reservoir element is located on the tool surface on a downstream side of the composite preform. The resin reservoir element and tool surface define a resin reservoir. The resin reservoir has a reservoir outlet and a reservoir inlet located between the tool surface and the reservoir outlet. A vacuum bagging film is placed over the tool surface to cover the composite preform and resin reservoir element. The vacuum bagging film is sealed relative to the tool surface to define a sealed resin infusion chamber between the tool surface and the vacuum bagging film. The composite preform and resin reservoir element are located in the resin infusion chamber. A resin supply is provided. A resin flow path is provided from the resin supply to the resin infusion chamber on an upstream side of the composite preform, through the composite preform and through the reservoir inlet to the resin reservoir. At least partial vacuum pressure is applied to the reservoir outlet to establish a pressure differential between the resin supply and the reservoir outlet to drive resin from the resin supply through the resin flow path, infusing the composite preform with resin and collecting excess resin in the resin reservoir.

In one or more preferred embodiments, the resin reservoir element comprises a channel having a first lower edge located toward the composite preform and an opposing second lower edge located away from the composite preform. A gap is formed between the first lower edge and the tool surface to define the reservoir inlet.

The method may further comprise locating a first permeable flow media between the first lower edge and the tool surface to at least partially define the gap.

The method may further comprise comprising removably sealing the second lower edge relative to the tool surface.

In one or more preferred embodiments, the resin reservoir element is located so as to extend along at least a majority of the length of a downstream edge of the composite preform.

A resin flow control choke may be located in the resin flow path between the composite preform and the resin reservoir.

The method may further comprise providing a second permeable flow media between the reservoir outlet and a vacuum outlet port extending from the tool surface through the tool to define a vacuum flow path. At least partial vacuum pressure may be applied through the vacuum flow path.

According to a second aspect, the present disclosure provides a method of forming a composite article. The method comprises resin infusing a composite preform according to the method defined above to form a resin infused composite preform and curing the resin infused composite preform.

Following curing of the resin infused composite preform, the resin reservoir element may be removed from the tool surface. Excess resin collected in the reservoir may then be removed from the resin reservoir element.

According to a third aspect, the present disclosure provides a resin infusion system for resin infusing a composite preform. The system includes a tool having an upper tool surface receiving a composite preform to be resin infused and a resin supply. A resin reservoir element is located on the tool surface on a downstream side of the composite preform. The resin reservoir element and tool surface define a resin reservoir having a reservoir outlet and a reservoir inlet located between the tool surface and the reservoir outlet. A vacuum bagging film covers the composite preform and the resin reservoir element to define a sealed resin infusion chamber between the vacuum bagging film and the tool surface. The composite preform and resin reservoir element are located in the resin infusion chamber. A resin flow path extends from the resin supply to the resin infusion chamber on an upstream side of the composite preform, through the composite preform and through the reservoir inlet to the resin reservoir. A vacuum source communicates with the reservoir outlet via a vacuum flow path.

In one or more preferred embodiments, the resin reservoir element comprises an elongate inverted channel section having closed opposing ends.

The channel section may have a first lower edge located toward the composite preform and an opposing second lower edge located away from the composite preform. In this configuration, the reservoir inlet may comprise a gap between the first lower edge and the tool surface.

The system may further comprise a first permeable flow media located between the first lower edge and the tool surface to at least partially define the gap.

The second lower edge of the channel section may be removably sealed to the tool surface.

In a preferred embodiment, the channel section has a generally semi-circular cross-section.

The reservoir outlet may advantageously be located at or adjacent an uppermost portion of the resin reservoir element.

In a preferred embodiment, the resin reservoir element extends along at least a majority of the length of a downstream edge of the composite preform.

The system may further comprise a permeable resin flow control choke located in the flow path between the composite preform and the resin reservoir.

In one or more preferred embodiments the vacuum flow path extends through a vacuum outlet port extending from the tool surface through the tool and a second permeable flow media extends from the reservoir outlet to the vacuum outlet port. In this configuration, the vacuum bagging film extending over the second permeable flow media and the vacuum outlet port.

In one or more embodiments, a plurality of the reservoir outlets are spaced along the resin reservoir element.

The features described above may be implemented independently in various embodiments of the present disclosure or may be combined in yet other embodiments as will be appreciated by persons skilled in the art.

BRIEF DESCRIPTION OF THE DRAWINGS

Preferred embodiments of the present disclosure will now be described, by way of examples only, with reference to the accompanying drawings wherein.

DETAILED DESCRIPTION

Methods and systems according to exemplary embodiments of the present disclosure will now be described in detail. In general, methods of resin infusing a composite preform according to the present disclosure include locating a composite preform on an upper tool surface of a tool. A resin reservoir element is located on the tool surface on a downstream side of the composite preform. The resin reservoir element and tool surface define a resin reservoir which has a reservoir outlet and a reservoir inlet that is located between the tool surface and the reservoir outlet, thus locating the reservoir outlet at a position higher than the reservoir inlet. A vacuum bagging film is placed over the tool surface to cover both the composite preform and the resin reservoir element. The vacuum bagging film is sealed relative to the tool surface to define a sealed resin infusion chamber between the tool surface and vacuum bagging film, with the composite preform and resin reservoir element located in the resin infusion chamber. A single vacuum bagging film may be utilized. A double vacuum bagging film configuration is also envisaged, with an outer vacuum bagging film located over an inner vacuum bagging film, with breather material located therebetween. A resin flow path is provided from a resin supply to the resin infusion chamber on an upstream side of the composite preform, through the composite preform and through the reservoir inlet to the resin reservoir. At least partial vacuum pressure is applied to the reservoir outlet to establish a pressure differential between the resin supply and reservoir outlet to drive resin from the resin supply through the resin flow path, particularly through the composite preform, thereby infusing the composite preform with resin. For a double vacuum bagging film configuration, at least partial vacuum pressure may also be applied to the cavity between the inner and outer vacuum bagging films. Excess resin that passes through the composite preform prior to turning off the vacuum source is collected in the resin reservoir. The resin infused composite preform may then be cured, typically within a heated oven. Excess resin collected in the reservoir will typically cure within the resin reservoir. Following curing, and disassembly of the system by removal of the vacuum bagging film(s) and associated consumables, the resin reservoir element may be removed from the tool and either discarded or cleaned of the cured resin collected in the resin reservoir.

Figure 3:
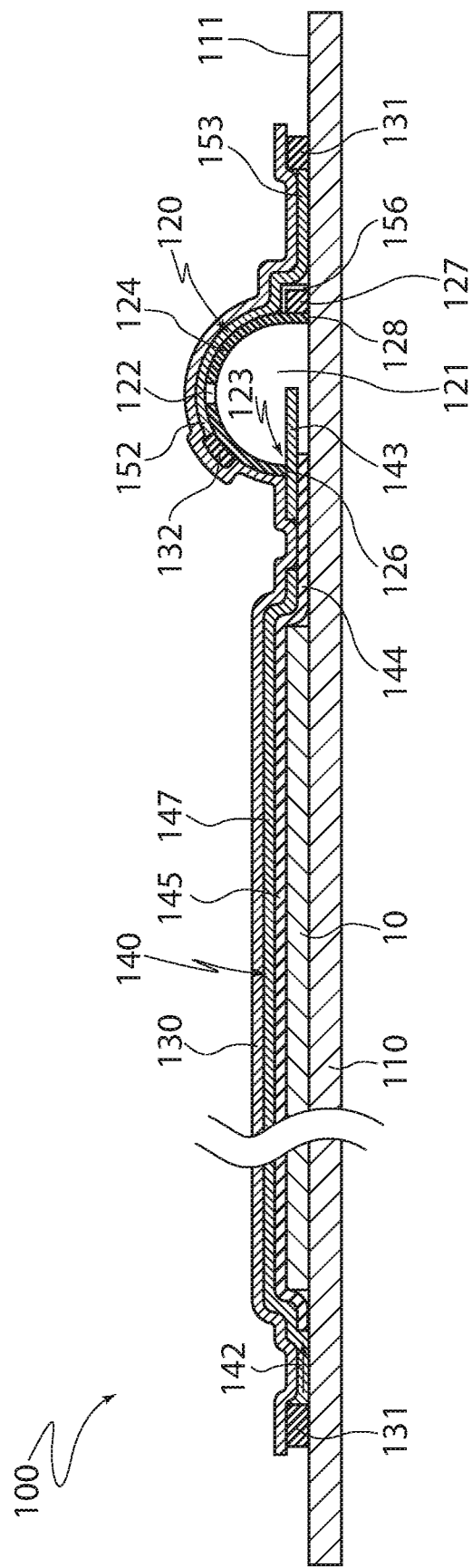
FIG. 3 is a schematic cross-sectional view of the system of FIG. 1 taken at cross-section 3-3.
Figure 4:
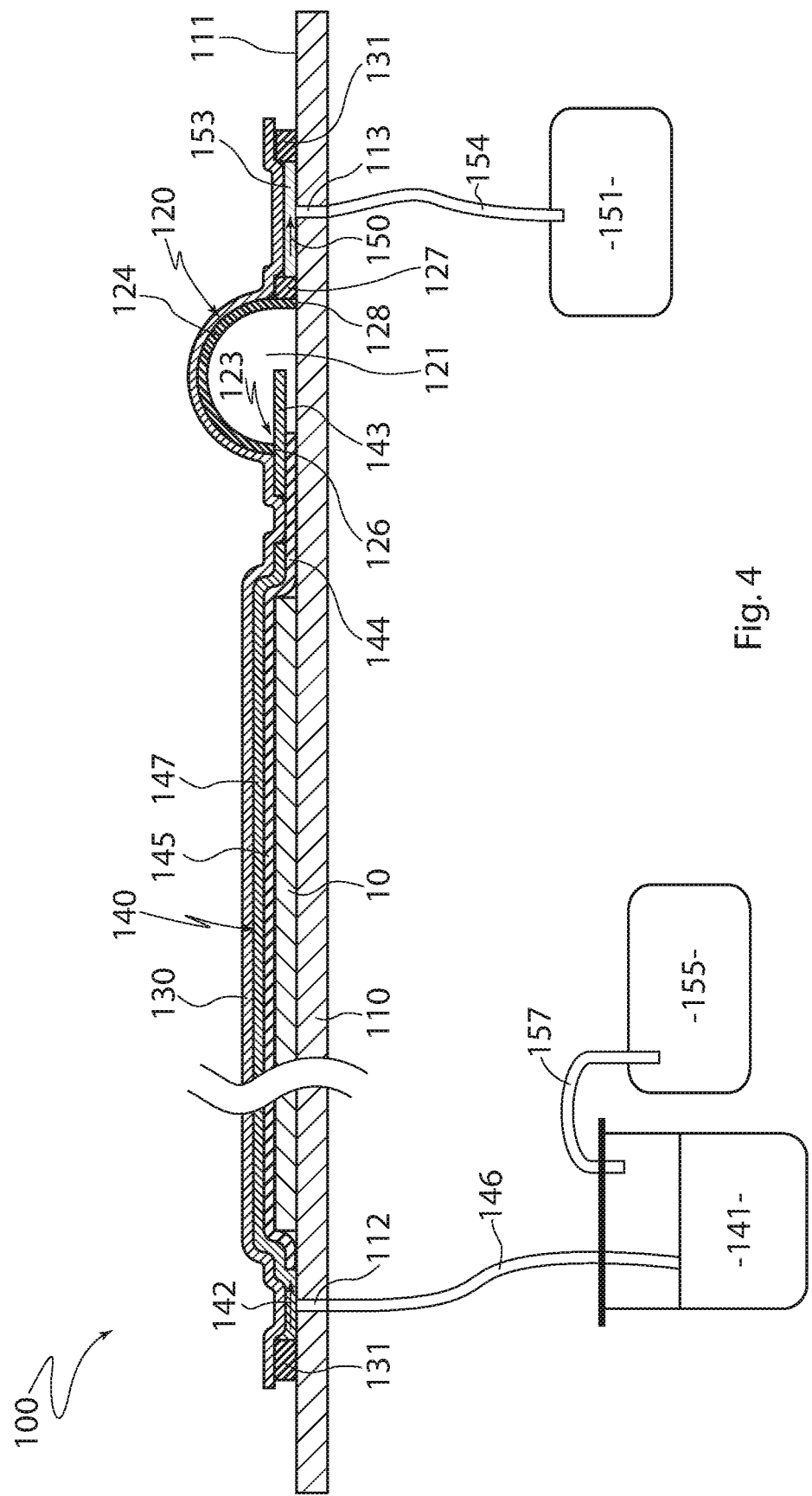
FIG. 4 is a schematic cross-sectional view of the system of FIG. 1 taken at cross-section 4-4.

Now referring to FIGS. 1 to 4 of the accompanying drawings, a system 100 for resin infusing a composite preform 10, according to a first embodiment, will now be described. The system 100 has a tool 110 having an upper tool surface 111 on which the composite preform 10 to be resin infused is located. A resin reservoir element 120 is located on the tool surface 111 on a downstream side of the composite preform 10. In the context of the present specification, upstream and downstream sides of the composite preform 10 are identified with reference to the direction of flow of resin, as will be further described. Referring particularly to FIG. 3, the reservoir element 120, together with the tool surface 111, defines a resin reservoir 121 having a reservoir outlet 122 and a reservoir inlet 123 located between the tool surface 111 and the reservoir outlet 122. A vacuum bagging film 130 covers the composite preform 10 and the resin reservoir element 120 to define a sealed resin infusion chamber 140 between the vacuum bagging film 130 and the tool surface 111. The composite preform 10 and resin reservoir element 120 are located in the resin infusion chamber 140. The system 100 further comprises a resin supply 141 with a resin flow path 142 extending from the resin supply 141 to the resin infusion chamber 140 on an upstream side of the composite preform 10, through the composite preform 10 and through the reservoir inlet 123 into the resin reservoir 121. Referring to FIG. 4, a first vacuum source 151 communicates with the reservoir outlet 122 via a vacuum flow path 150.

The tool 110 may be formed of any of various structural materials, including mild steel, stainless steel, invar or a carbon composite material that will maintain its form at elevated temperatures associated with curing, so as to provide a geometrically stable tool surface 111 though the resin curing process. The tool surface 111 may be substantially flat for the production of composite structures having a substantially flat lower surface, such as wing or fuselage skin panels, or otherwise shaped as desired so as to provide a shaped surface of a non-planar composite structure.

The composite preform 10 may take any form suitable for resin infusion and as dictated by the geometric and structural requirements of the laminated composite structure to be fabricated. The composite preform 10 may comprise a layup of multiple plies of reinforcing material, each formed of woven or braided fibres and/or chopped strand mat. The preform plies may be formed of any of various reinforcing fibres, such as carbon, graphite, glass, aromatic polyamide or any other suitable material for forming a resin reinforced laminated composite structure. The plies may form a dry preform, without any resin, or alternatively the preform may have some pre-existing resin content prior to the resin infusion process. The composite preform 10 is located on the tool surface 111 with the lower surface of the preform 10 oriented on the tool surface 111 such that the lower surface of the resulting cured composite structure will match the form of the tool surface 111. The composite preform 10 located on the tool surface 111 has a laterally extending downstream edge 11, an opposing laterally extending upstream edge 12 and opposing longitudinally extending side edges 13. The preform 10 may take any desired shape corresponding to the shape of the laminated composite structure to be formed.

The resin reservoir element 120, in the exemplary first embodiment depicted, comprises an elongate inverted channel section 124 with closed opposing ends 125. In the first embodiment depicted, the channel section 124 has a generally semi-circular cross-section, however it is envisaged that the channel section 124 may take any of various alternate forms, including rectangular, square, triangular, semi-hexagonal or any of various other cross-sectional shapes. A semi-circular cross-section is advantageous in that it does not present any sharp edges on its outer surface which may otherwise puncture the vacuum bagging film 130 or be difficult to seal. A channel section 124 with a semi-circular cross-section may also typically be inexpensive to form, able to be formed by cutting a tubular section in half and to length. The resin reservoir element 120 may be formed of any of various materials, including metallic materials such as stainless steel or aluminum or other non-metallic materials including composite materials or thermosetting plastics that preferably maintain their shape at elevated temperatures associated with the resin curing process. The closed opposing ends 125 of the resin reservoir element 120 may be integrally formed with the channel section 124 or otherwise secured to the ends of the channel section 124, such as by bonding and/or mechanical fastening. The opposing ends 125 of the resin reservoir element 120 may be formed of the same material as that of the channel section 124. Alternatively, the opposing ends 125 of the resin reservoir element 120 may be formed of a material different to that from which the channel section 124 is formed.

Figure 5:
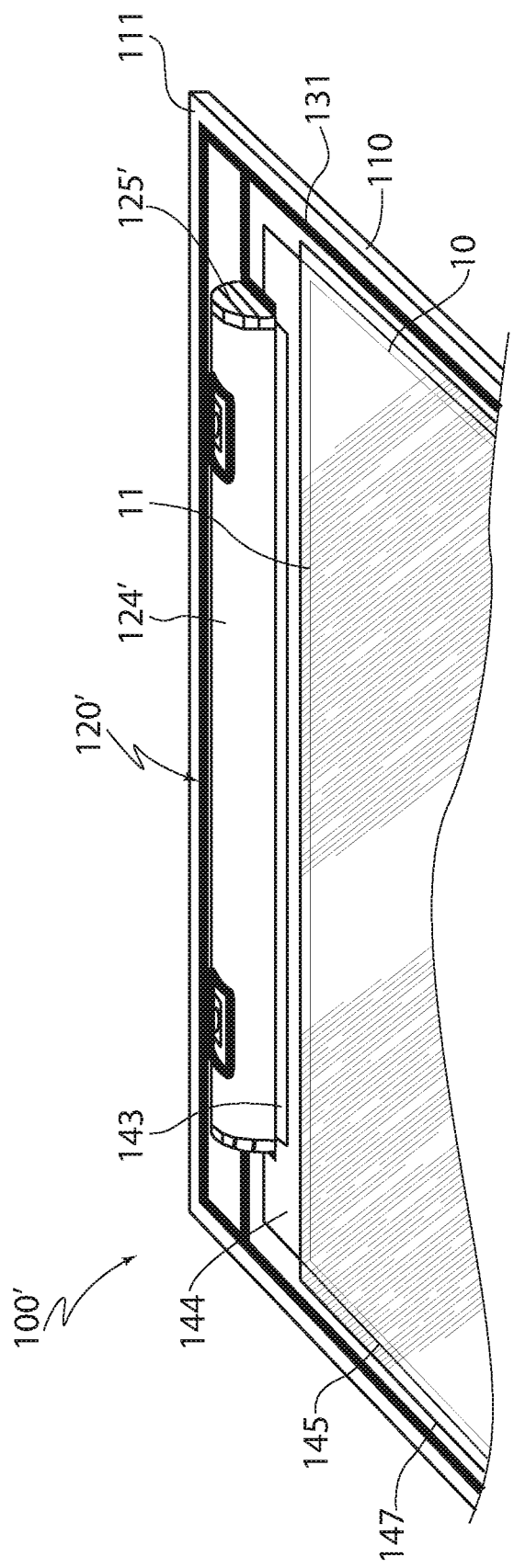
FIG. 5 is schematic partial perspective view of a modified form of the system of FIG. 1.

In one modified form 100' of the system 100 of the first embodiment, as depicted in FIG. 5, the opposing ends 125' of a modified resin reservoir element 120' are formed from multiple pieces of sealing tape, as otherwise used to seal the vacuum bagging film 130 and other components of the system, as will be further described below. In this modified form, the resin reservoir element 120' may be simply formed from a cut length of a channel section 124', which may be located on the tool surface 111 with the ends of the defined resin reservoir then sealed with the use of sealing tape to form the closed opposing ends 125' of the resin reservoir element 120'.

Figure 1:
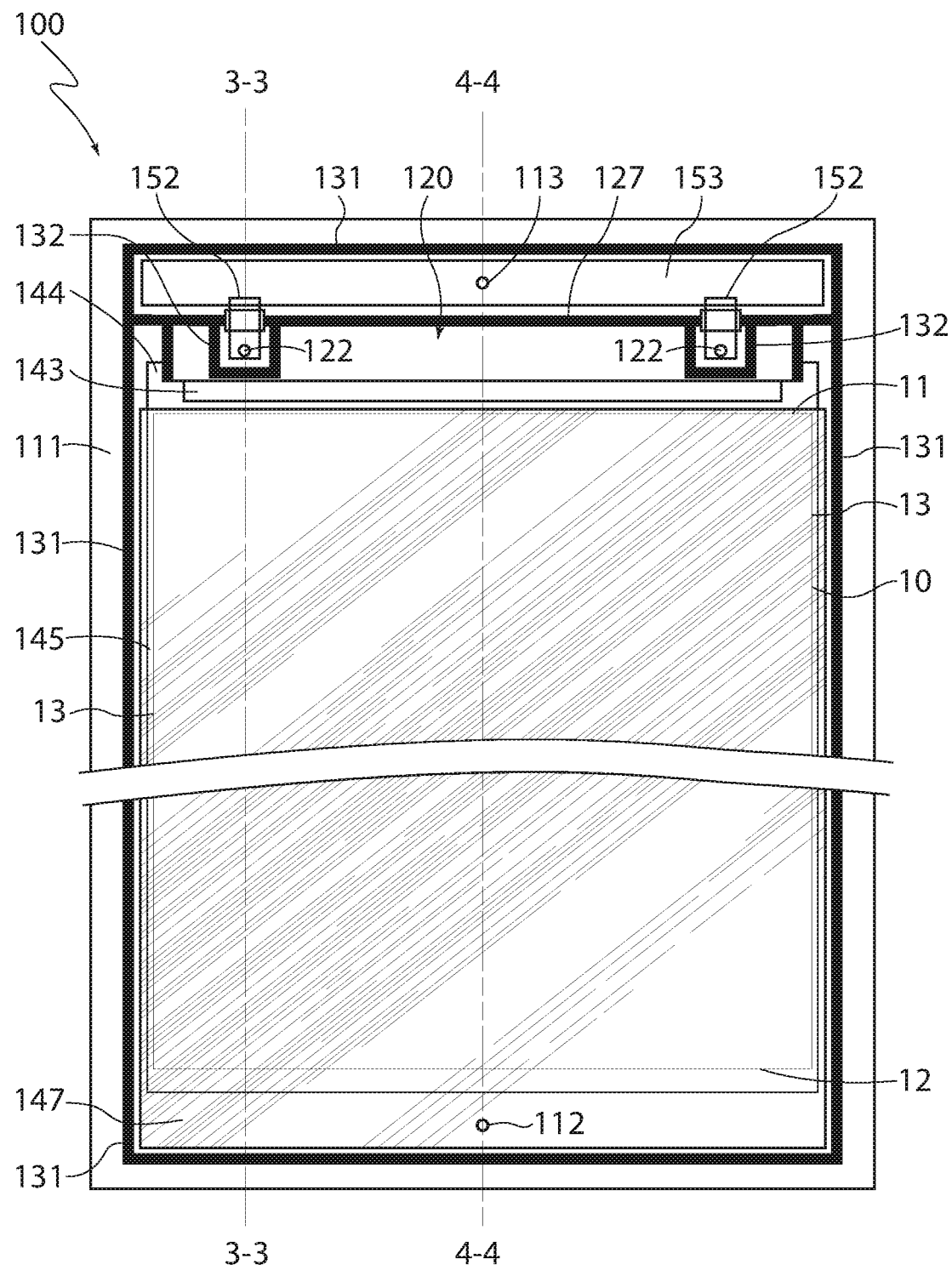
FIG. 1 is a schematic plan view of a system for resin infusing a composite preform according to a first embodiment.

Referring to FIG. 1, in the first embodiment, the resin reservoir element 120 is located on the tool surface 111 so as to extend along at least a majority of the length of the downstream edge 11 of the composite preform 10. Having the resin reservoir element 120 formed of a sufficient length to extend along at least a majority of the length of the downstream edge 11 of the composite preform 10 provides a relatively direct flow path from along the downstream edge 11 of the composite preform 10 into the resin reservoir 121 along the downstream edge 11. In configurations where the downstream edge 11 of the composite preform 10 is linear, the resin reservoir element 120 may advantageously be arranged generally parallel to the downstream edge 11 of the composite preform 10.

Figure 2:
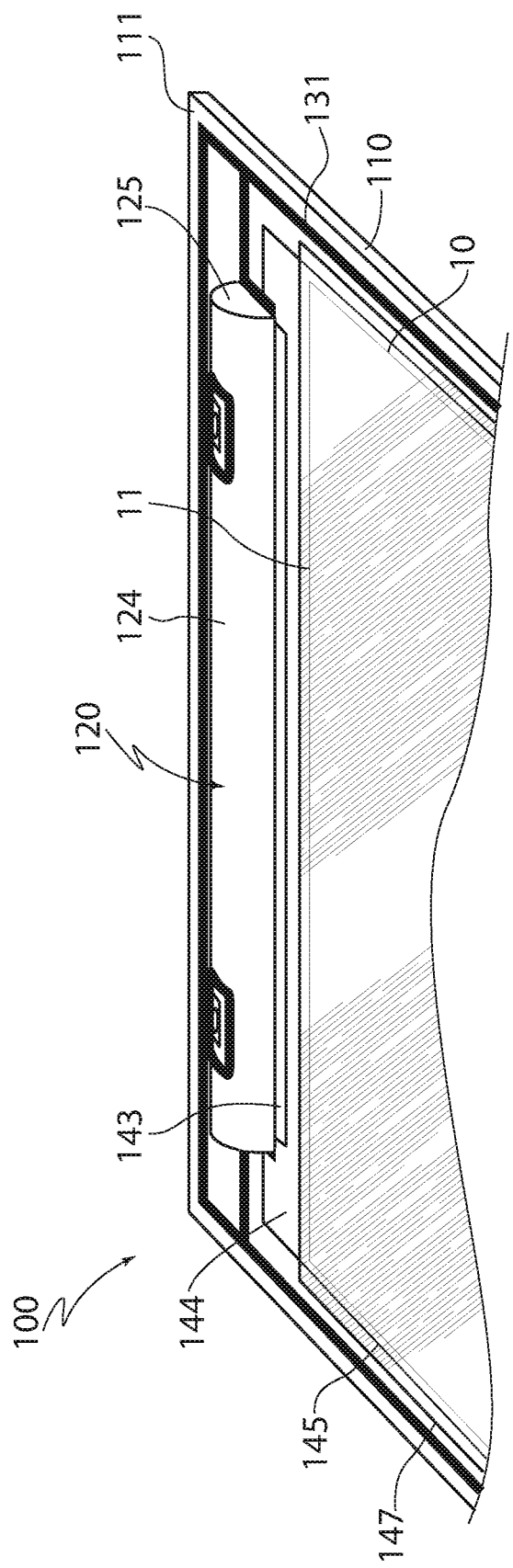
FIG. 2 is a schematic partial perspective view of the system of FIG. 1.

As depicted in FIGS. 1 and 2, in the first embodiment two reservoir outlets 122 are provided, spaced along the channel section 124. It is also envisaged that a single reservoir outlet 122 only may be provided. Alternatively, three or more reservoir outlets 122 may be provided, spaced along the channel section 124. The reservoir outlets 122 may advantageously be located at or adjacent an uppermost portion of the resin reservoir element 120. In the embodiment depicted, the reservoir outlets 122 are located at the top of the channel section 124, as best depicted in FIGS. 1 and 3, so as to maximize the vertical separation between the reservoir inlet 123 and reservoir outlets 122.

Referring to FIGS. 3 and 4, in the system 100 of the first embodiment, the channel section 124 of the resin reservoir element 120 has a first lower edge 126 located toward the downstream edge 11 of the composite preform 10 and an opposing second lower edge 127 located away from the composite preform 10, such that the first lower edge 126 is effectively the upstream edge and the second lower edge 127 is effectively the downstream edge. In the particular configuration depicted, the reservoir inlet 123 is defined by a gap formed between the first lower edge 126 and the tool surface 111. In the embodiment depicted, a laterally extending first strip 143 of permeable flow media and a downstream portion 144 of a permeable peel ply 145 (which itself constitutes a permeable flow media) placed over the preform 10 (as will be further discussed below) extend into, and define, the gap defining the reservoir inlet 123. The first strip 143 and downstream portion 144 of the peel ply 145 support the first lower edge 126 of the channel section 124. The first strip 143 of permeable flow media and downstream portion 144 of the peel ply 145 are sufficiently permeable to allow resin to pass therethrough into the reservoir inlet 123. The first strip 143 of permeable flow media may suitably be in the form of a nylon mesh material, such as PLASTI-NET®15231 available from Airtech International Inc, or any other highly permeable media enabling passage of resin therethrough. The peel ply 145 also constitutes a permeable flow media, and may suitably be in the form of a PTFE coated fibreglass fabric, such as RELEASE EASE® 234 also available from Airtech International Inc, or any other permeable peel ply material.

It is envisaged that either the first strip 143 of permeable flow media or downstream portion 144 of the peel ply 145 may be omitted, leaving a single permeable flow media to define the gap of the reservoir inlet 123. It is still further envisaged that the reservoir inlet 123 may be defined by one or more apertures provided along the length of the resin reservoir element 120, although the arrangement depicted avoids the need for drilling or otherwise forming such apertures in the resin reservoir element 120.

The second lower edge 127 of the channel section 124 may be removably sealed relative to the tool surface 111, and in the embodiment depicted is removably sealed by way of a strip 128 of sealing tape, which may conveniently be in the form of a mastic sealant tape, such as GS-213-3 sealant tape available from Airtech International Inc.

The resin flow path 142 extending from the resin supply 141, through the resin infusion chamber 140, composite preform 10 and reservoir inlet 123 into the resin reservoir 121 is comprised of a series of plumbing elements and consumable layup materials. The upstream portion of the resin flow path 142 may comprise one or more resin supply pipes 146 communicating with one or more resin infusion inlets 112 extending through the tool 110 on the upstream side of the composite preform 10, delivering resin to the resin infusion chamber 140 on the upstream side of the composite preform 10. The resin supply pipes 146 are typically formed of copper.

The mid portion of the resin flow path 142 is formed by the composite preform 10, the peel ply 145 and a layer 147 of permeable flow media. The peel ply 145 extends over the entirety of the composite preform 10, beyond each of the edges 11, 12, 13 of the composite preform 10. The peel ply 145 serves both to prevent the layer 147 of permeable flow media from sticking to the composite preform 10 and to provide a path for infusion of resin into the composite preform 10, both along the upstream edge 12 of the composite preform 10 and through the upper surface of the composite preform 10. The layer 147 of permeable flow media, which in the embodiment depicted is formed of the same material as the first strip 143 of permeable flow media, extends over the peel ply 145. In the embodiment depicted, the layer 147 of permeable flow media extends beyond the upstream edge 12 of the composite preform 10 over the one or more resin infusion inlet ports 112 and beyond the downstream edge 11 of the composite preform 10, leaving a gap between the downstream edge of the layer 147 of permeable flow media and the strip 143 of permeable flow media. Rather than communicating the resin infusion chamber 140 with the resin supply 141 through a resin flow path 142 passing through the resin inlet port 112 extending through the tool 110, it is also envisaged that the resin flow path 142 could pass through the vacuum bagging film 130. In such a configuration an aperture may be formed in the vacuum bagging film 130 and communicated with the resin supply 141, sealing around the aperture.

The downstream portion of the resin flow path 142 is formed by the downstream portion 144 of the peel ply 145 and the strip 143 of permeable flow media.

The vacuum flow path 150 communicating the first vacuum source 151 with the reservoir outlets 122 is comprised of a series of plumbing elements and consumable layup materials. The upstream portion of the vacuum flow path 150 extending from the reservoir outlets 122 comprises a second permeable flow media. The second permeable flow media may conveniently be formed of the same material as the layer 147 and strip 143 of permeable flow media used in the resin flow path 142, however it is also envisaged that other forms of permeable flow media may be utilised as desired. The second permeable flow media here comprises two strips 152 of permeable flow media located on the resin reservoir element 120, each covering one of the reservoir outlets 122, and a laterally extending further strip 153 of permeable flow media that communicates the strips 152 with a vacuum outlet port 113 extending through the tool 110 downstream of the resin reservoir element 120. Tape 156 may be applied to the exposed faces of the strip 128 of sealing tape sealing the resin reservoir element 120 to the tool surface 111 so as to prevent the strips 152, 153 of second permeable flow media from sticking to the strip 128 of sealing tape. The vacuum outlet port 113 communicates with the first vacuum source 151 by way of one or more vacuum outlet pipes 154, forming the downstream portion of the vacuum flow path 150. The vacuum outlet pipes 154 are typically formed of copper. Rather than communicating the reservoir outlets 122 with the first vacuum source 151 through a vacuum flow path 150 passing through the vacuum outlet port 113 extending through the tool 110, it is also envisaged that the vacuum flow path 150 could pass through the vacuum bagging film 130. In such a configuration an aperture may be formed in the vacuum bagging film 130 and communicated with the first vacuum source 151, sealing around the aperture.

The vacuum bagging film 130 extends over the entire layup formed by the composite preform 10, peel ply 145 and layer 147 of permeable flow media and further extends over the resin reservoir element 120 and strips 152, 153 of second permeable flow media. Any of various vacuum bagging film materials may be utilized, including but not limited to Airtech WL7400 or SL800 vacuum bagging films available from Airtech International Inc. The vacuum bagging film 130 is sealed relative to the tool surface 111 about the periphery of the vacuum bagging film 130 by way of further strips 131 of sealing tape, typically formed of the same material as the strip 128 of sealing tape sealing the second lower edge 127 of the channel section 124 to the tool surface 111. Additional strips 132 of sealing tape seal the vacuum bagging film 130 to the resin reservoir element 120 about the strips 152 of second permeable flow media to isolate the resin infusion flow path 142 and resin infusion chamber 140 from the vacuum flow path 150. As may be best appreciated from FIGS. 3 and 4, the vacuum bagging film 130 defines the upper boundary of the resin flow path 142. In between the downstream edge of the layer 147 of permeable flow media and the upstream edge of the strip 143 of permeable flow media, the vacuum bagging film 130 restricts the resin flow path 142 to the downstream portion 144 of the peel ply 145, which defines a permeable resin flow control choke. The vacuum bagging film 130 also defines the upper boundary of the vacuum flow path 150.

In use, once the system 100 has been assembled as discussed above, the resin supply 141 is catalyzed and heated to bring the resin to a suitable resin infusion temperature. Typically the entire system is heated within an oven that is also used for subsequent curing. The temperature for resin infusion will be dependent upon the resin system utilised, and will typically be selected to provide a suitable viscosity enabling the resin to be infused through the resin flow path 142. Any resin suitable for use in resin infusion processes, and as dictated by desired characteristics of the composite structure to be formed, may be utilised. Suitable resins may include epoxy, bismaleimide, benzoxazine, polyimide and polyamide-imide resins. At least partial vacuum pressure is applied to the reservoir outlet 123, via the first vacuum source 151 and vacuum flow path 150. A smaller partial vacuum (i.e., a higher absolute pressure) may also be applied to the resin supply 141, by way of a second vacuum source 155 connected to a second vacuum pipe 157, as best shown in FIG. 4. Where partial vacuum is applied to the resin supply 141 by the second vacuum source 155, a pressure differential may be maintained between the first vacuum source 151 and second vacuum source 155 such that the absolute pressure at the reservoir outlet 123 applied by the first vacuum source 151 is lower than the absolute pressure at the resin supply 141. In one example, a full vacuum (0 mBar/0 kPA) may be applied by the first vacuum source 151 and a higher pressure/lower vacuum of 500 to 800 mBar (50 to 80 kPA) may be applied by the second vacuum source 155, thereby providing a pressure differential of the same amount driving resin from the resin supply 141 through the resin flow path 142. Full vacuum pressure may also be applied to the second vacuum source 155 prior to resin infusion to degas the resin.

Maintaining at least partial vacuum on the resin supply 141 ensures at least a partial vacuum is maintained throughout the resin infusion chamber 140. Atmospheric pressure acting on the preform 10 through the vacuum bagging film 130, the layer 147 of permeable flow media and the peel ply 145 acts to consolidate the composite preform 10. Resin moves through the resin infusion chamber 142 along a wave front, through the layer 147 of permeable flow media, which will generally have a greater permeability than both the peel ply 145 and the composite preform 10, thus forming the path of least resistance. Resin passing through the layer 147 of permeable flow media will infuse down through the less permeable peel ply 145 and into the preform 10. Some resin will also flow laterally through the upstream edge 12 of the composite preform 10 and, to a lesser degree, through the opposing side edges 13 of the composite preform 10. Having the downstream edge 11 of the layer 147 of permeable flow media finish short of both the strip 123 of permeable flow media and the downstream portion 144 of the peel ply 145 prevents resin bypassing the preform 10 and simply being drawn through the layer 147 of permeable flow media directly into the resin reservoir 121. The rate of advance of the resin wave front is inhibited by forcing the resin to pass downstream longitudinally through the permeable resin flow control choke defined by the downstream portion 144 of the peel ply 145 once it passes the downstream edge 11 of the composite preform 10 and the downstream edge of the layer 147 of permeable flow media, prior to reaching the resin reservoir 121. Rather than forming the permeable resin flow control choke with the downstream portion 144 of the peel ply 145, it is also envisaged that a separate permeable resin flow control choke, typically formed of a permeable media of reduced permeability as compared to the layer 147 of permeable control media, may be utilised between the composite preform 10 and the resin reservoir 121 to control advance of the resin wave front.

The resin wave front will typically not advance evenly across the lateral extent of the composite preform 10, particularly where there are non-uniform geometries or thickness of the composite preform 10. Where a region of the resin wave front first reaches the reservoir inlet 123, resin will flow into the resin reservoir 121. With vacuum being drawn through the resin outlets 122, located higher than the reservoir inlet 123, gravity acting on the resin will result in the resin not tending to be drawn through the reservoir outlets 122 and along the vacuum flow path 150 toward the first vacuum source 151. Resin infusion may thus continue without resin being driven into the vacuum pipe 154 until visual confirmation is received that the entire resin wave front has reached the downstream edge 11 of the composite preform 10, thus indicating complete resin infusion of the composite preform 10. Once completion of resin infusion has been visually identified, a resin inlet valve (not depicted) on the resin supply pipe 146 may be closed to prevent further infusion of resin. Rather than relying on visual identification, completion of resin infusion may be determined based on a predetermined resin infusion time period. At the completion of resin infusion, rather than closing a resin inlet valve, the oven temperature may be elevated to commence curing of the resin, therefore stopping further infusion.

The resin infused composite preform 10 may be cured by elevating the temperature of the oven to a temperature suitable for curing of the resin. For epoxy resins, curing temperatures of the order of 180° C. to 200° C. will be typical. Full vacuum is typically maintained on the first vacuum source 151 during the curing process, to ensure the resin infused composite preform 10 remains consolidated and to assist in curing of the resin.

Once the resin has cured, and the system cooled to room temperature, the various consumable layers, including the vacuum bagging film 130, the layer 147 and various strips 143, 152, 153 of permeable flow media, and peel ply 145 are removed, along with the resin reservoir element 120. The resin reservoir element 120 may be removed from the tool surface 111 and excess resin that has been collected and cured in the resin reservoir 121 may be removed, allowing the reuse of the resin reservoir element 120. Alternatively, the resin reservoir element 120 may be discarded. Discarding of the resin reservoir element 120 will particularly be suitable where it is inexpensively formed from cutting a simple tubular section.

Vacuum bagging films typically exhibit some air permeability, particularly at elevated temperatures associated with resin infusion and/or resin cure. Accordingly, one potential deficiency of the single vacuum bag configuration of the resin infusion system 100 of the first embodiment is that, with vacuum applied during the curing process, air may permeate through the vacuum bagging film 130 and into the composite preform 10, potentially resulting in porosity and resin starvation within the cured composite laminate. A double bag resin infusion system is thus envisaged in an effort to minimize or avoid such air permeation, by providing a second vacuum bagging film covering the first vacuum bagging film and applying vacuum pressure to the second vacuum bagging film during both the resin infusion and curing stages of operation.

Figure 6:
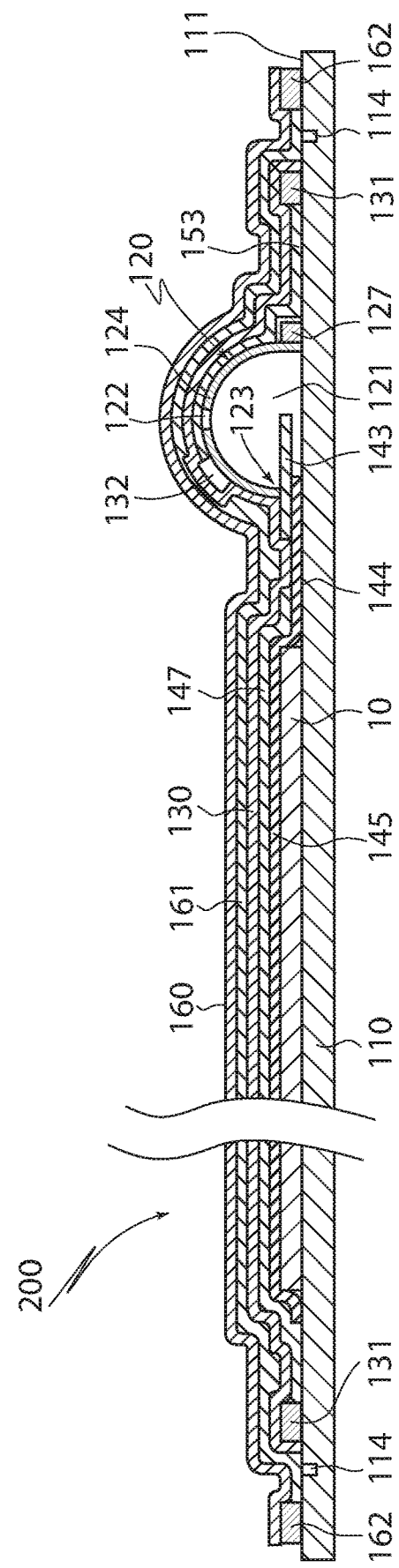
FIG. 6 is a schematic cross-sectional view of a system for resin infusing a composite according to a second embodiment, taken at a cross-section equivalent to FIG. 3.
Figure 7:
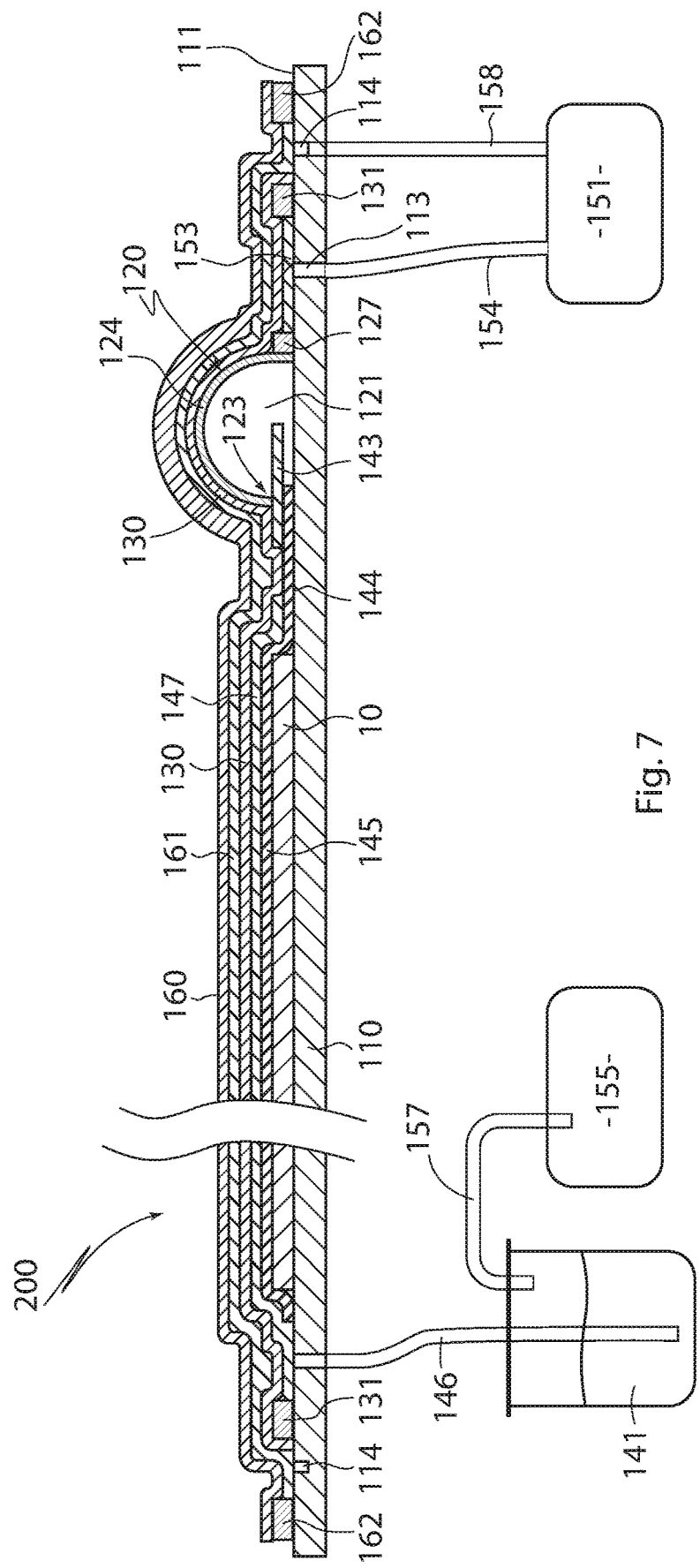
FIG. 7 is a schematic cross-sectional view of a system for resin infusing a composite according to a second embodiment, taken at a cross-section equivalent to FIG. 4.

FIGS. 6 and 7 depict schematic cross-sectional views (corresponding to FIGS. 3 and 4) of such a double-bag configuration of the system 100 of the first embodiment, forming a system 200 according to a second embodiment. The system 200 of the second embodiment is substantially identical to the system 100 of the first embodiment, with the addition of a second vacuum bagging film 160 and associated breather layer 161. Accordingly, features of the system 200 of the second embodiment that are identical to features of the system 100 of the first embodiment are provided with identical reference numerals and will not be further discussed In the system 200 of the second embodiment as depicted in FIGS. 6 and 7, the composite preform 10, resin reservoir element 120 and associated consumable layers, such as the layer 147 and various strips 143, 152, 153 of permeable flow media, peel ply 145 and first vacuum bagging film 130 are first assembled in the same manner as described above in relation to the system 100 of the first embodiment. A breather layer 161, typically being a highly permeable fabric formed of fibreglass, polyester or the like is then located over, and fully covering, the first vacuum bagging film 130. A suitable breather layer is a breather cloth formed of a high film non-woven polyester material, such as AIRWEAVE® N10, available from Airtech International Inc. The breather layer 161 extends over a vacuum groove 114 that extends around the perimeter of the tool surface 111 and is connected to the first vacuum source 151 (or a separate third vacuum source) by way of a third vacuum pipe 158. The second vacuum bagging film 160 is then located to cover the entire breather layer 161 and is sealed relative to the tool surface 111 by way of further strips 162 of sealing tape, forming a sealed cavity between the first and second vacuum bagging films 130, 160. The composite preform 10 is resin infused and subsequently cured using the same process as described above in relation to the system 100 of the first embodiment, with at least a partial vacuum being applied to the sealed cavity between the first and second vacuum bagging films 130, 160 by the first vacuum source 151 (or separate third vacuum source) throughout resin infusion and curing. The second vacuum bagging film 160 and associated vacuum applied to the sealed cavity protects against any minor leaks associated with the first vacuum bag 130, with the vacuum applied evacuating any air permeating through the second vacuum bagging film 160 toward the composite preform 10 through the breather layer 161, rather than allowing it to permeate through to the composite preform 10.

Figure 8:
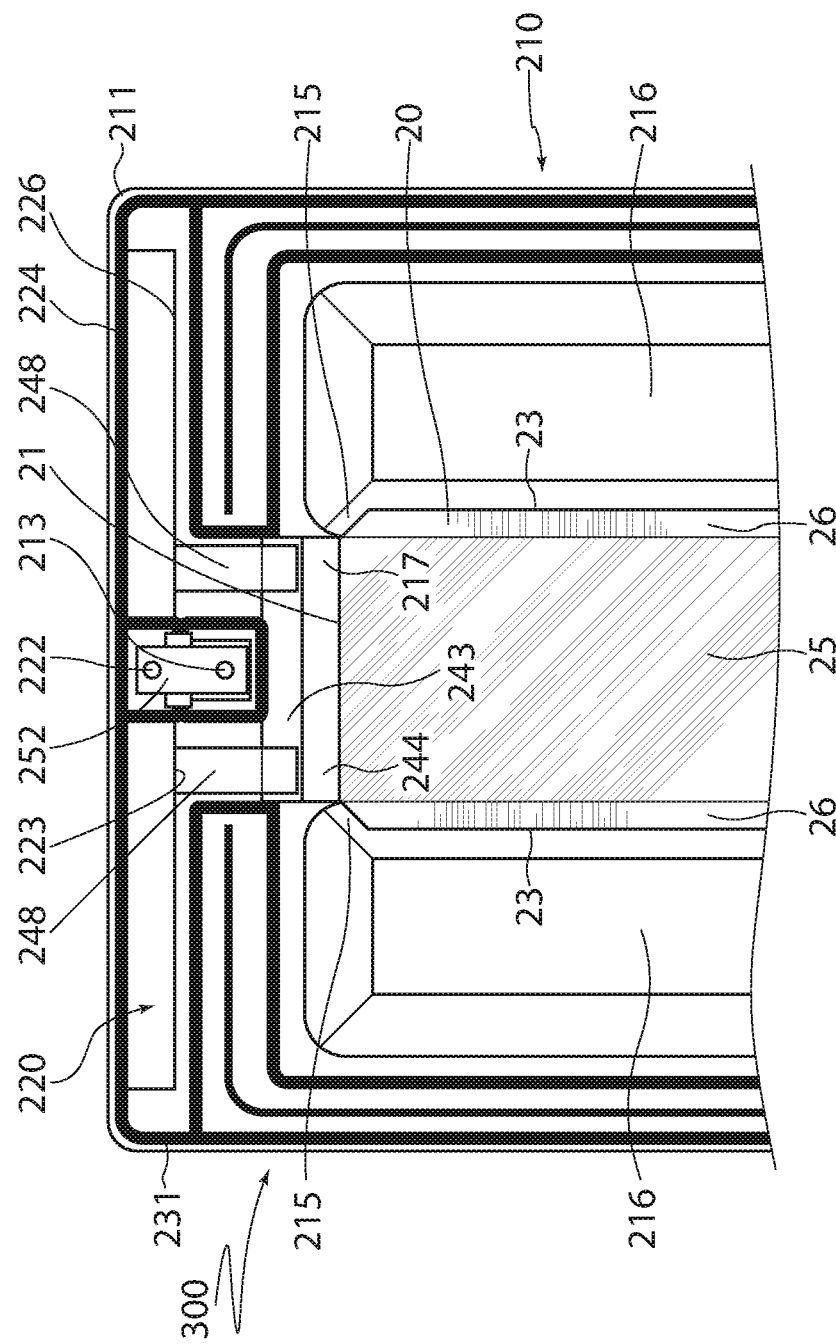
FIG. 8 is a schematic plan view of a system for resin infusing a composite preform according to a third embodiment.

Referring to FIG. 8 of the accompanying drawings, a system 300 for resin infusing a composite preform 20 according to a third embodiment will now be described. The system 300 is of the same basic configuration and adopts the same principles as the system 100 according to the first embodiment, but is particularly suitable for the production of elongate composite articles having a concave section, such as spars and d-noses of wings, moveable trailing edge assemblies, moving leading edge assemblies, vertical and horizontal stabilizers and the like. In FIG. 8, only the downstream portion of the system 300 is depicted, with the upstream portion, being of the same basic configuration as that of the system 100 of the first embodiment. Features of the system 300 of the third embodiment that are equivalent to those of the system 100 of the first embodiment are provided with like reference numerals, incremented by 100 in the accompanying drawings.

The composite preform 20, which particularly represents a composite preform for a moveable trailing edge spar, has a longitudinally extending central web 25 and opposing flanges 26 extending along the opposing side edges 23 of the composite preform 20. The composite preform 20, which would typically be flexible when first laid up, has opposing edge portions each forming a flange 26 draping over the upper tool surface 211 of the tool 210 along the side wall 215 of a corresponding recess 216 extending along the side of a central planar portion 217 of the tool surface 211. In the configuration of the system 200, the resin reservoir element 220 is located downstream of the vacuum outlet 213 extending through the tool 210. The portion of the resin flow path extending between the downstream edge 21 of the composite preform 20 and the reservoir inlet 223 is defined by a separate permeable resin flow control choke 244, a laterally extending strip 243 of permeable flow media extending laterally across a downstream portion of the flow control choke 244 and a pair of longitudinally extending further strips 248 of permeable flow media communicating the strip 243 of permeable flow media with the reservoir inlet 223, with the strips 248 extending beneath the first lower edge 226 of the channel section 224 of the resin reservoir element 220.

The resin reservoir element 220 is provided with a single centrally located reservoir outlet 222 which communicates with the first vacuum source (not depicted) via a vacuum flow path including a further strip 252 of permeable flow media extending from the reservoir outlet 222, and covering the vacuum outlet port 213. Strips of sealing tape 231 are again used to seal the vacuum bagging film covering the composite preform 20 (and peel ply and layer of permeable flow media located on the same, but not specifically depicted in FIG. 8) and resin reservoir element 220. Further strips of sealing tape are also used, consistent with the manner described above in relation to the system 100 of the first embodiment, to isolate the vacuum flow path from the resin infusion chamber. The composite preform 20 is then resin infused in the same general manner as described above in relation to the system 100 of the first embodiment. In a modified form of the system 300 of the third embodiment, a further vacuum bagging film may be utilized below the composite preform 20, between the composite preform 20 and the tool surface 211, such that the composite preform 20 is located indirectly on the tool surface 211.

Figure 9:
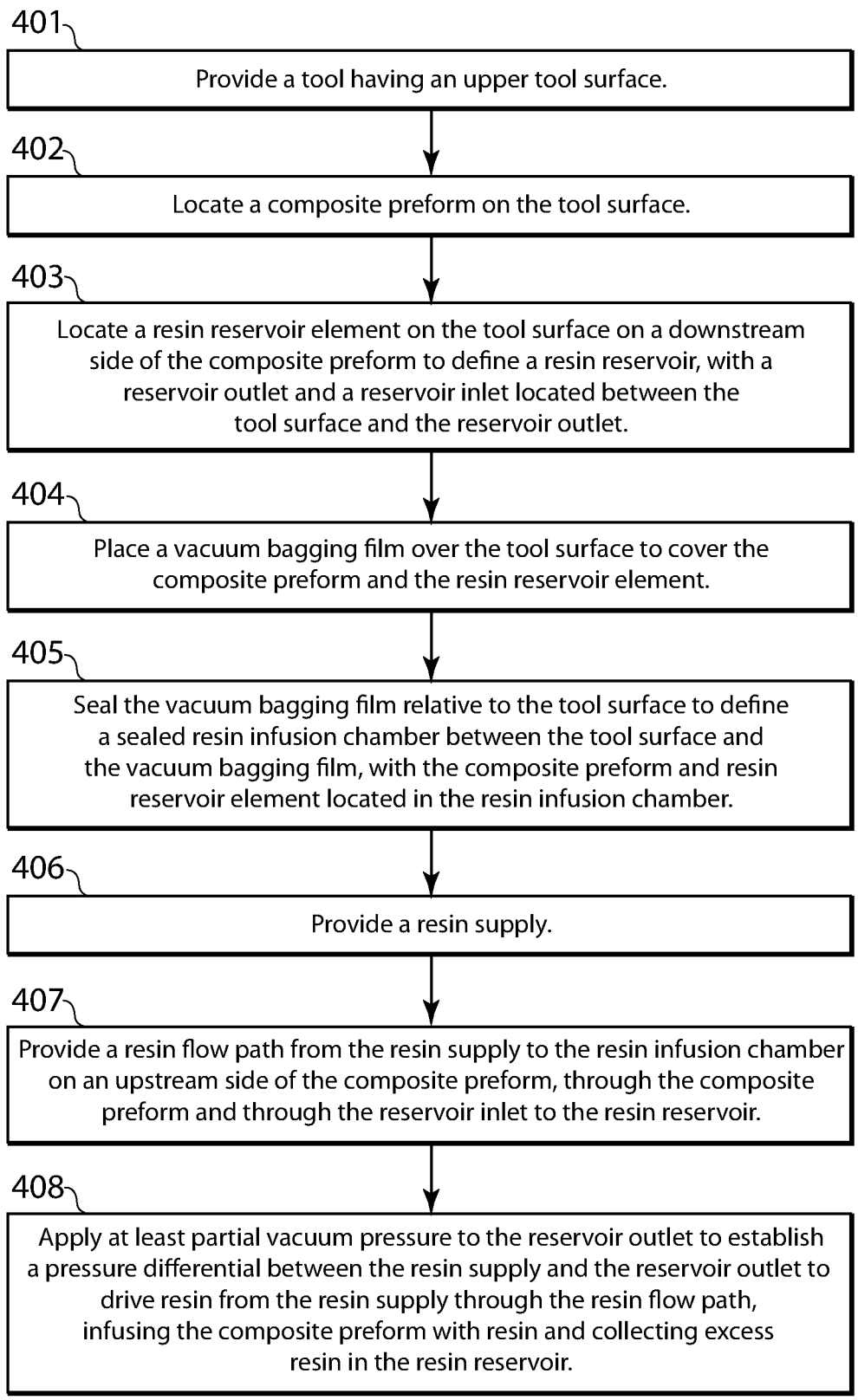
FIG. 9 is a flow chart of an exemplary method for resin infusing a composite preform.

A general method of resin infusing the composite preform as discussed above is depicted in general terms in the flow diagram of FIG. 9. At block 401, a tool having an upper tool surface is provided. A block 402, a composite preform is located on the tool surface. At block 403, a resin reservoir element is located on the tool surface on a downstream side of the composite preform. The resin reservoir element and tool surface define a resin reservoir, with the resin reservoir having a reservoir outlet and a reservoir inlet located between the tool surface and the reservoir outlet. Block 403 represents a vacuum bag being placed over the tool surface to cover the composite preform and the resin reservoir element. Block 405 represents the vacuum bagging film being sealed relative to the tool surface to define a sealed resin infusion chamber between the tool surface and vacuum bagging film, with the composite preform and resin reservoir element located in the resin infusion chamber. Block 406 represents provision of a resin supply. Block 407 represents provision of a resin flow path from the resin supply to the resin infusion chamber on an upstream side of the composite preform, through the composite preform and through the reservoir inlet to the resin reservoir. Block 408 represents application of at least partial vacuum pressure to the reservoir outlet to establish a pressure differential between the resin supply and the reservoir outlet to drive resin from the resin supply through the resin flow path, infusing the composite preform with resin and collecting excess resin in the resin reservoir.

Illustrative, non-exclusive examples of inventive subject matter according to the present invention are described in the clauses A1-C20, below:

A1. According to an aspect of the present disclosure there is provided a method of resin infusing a composite preform 10, said method comprising:

locating a composite preform 10 on an upper tool surface 111 of a tool 110; locating a resin reservoir element 120 on said tool surface 111 on a downstream side of said composite preform 10, said resin reservoir element 120 and said tool surface 111 defining a resin reservoir 121, said resin reservoir 121 having a reservoir outlet 122 and a reservoir inlet 123 located between said tool surface 111 and said reservoir outlet 122;

placing a vacuum bagging film 130 over said tool surface 111 to cover said composite preform 10 and said resin reservoir element 120;

sealing said vacuum bagging film 130 relative to said tool surface 111 to define a sealed resin infusion chamber 140 between said tool surface 111 and said vacuum bagging film 130, said composite preform 10 and said resin reservoir element 120 being located in said resin infusion chamber 140;

providing a resin supply 141;

providing a resin flow path 142 from said resin supply 141 to said resin infusion chamber 140 on an upstream side of said composite preform 10, through said composite preform 10 and through said reservoir inlet 123 to said resin reservoir 121;

applying at least partial vacuum pressure to said reservoir outlet 122 to establish a pressure differential between said resin supply 141 and said reservoir outlet 122 to drive resin from said resin supply 141 through said resin flow path 142, infusing said composite preform 10 with resin and collecting excess resin in said resin reservoir 121.

A2. Advantageously the method of clause A1, wherein said resin reservoir element 120 comprises a channel section 124 having a first lower edge 126 located toward said composite preform 10 and an opposing second lower edge 127 located away from said composite preform 10, said method further comprising forming a gap between said first lower edge 126 and said tool surface 111 to define said reservoir inlet 123.

A3. Advantageously the method of clause A2, further comprising locating a first permeable flow media between said first lower edge 126 and said tool surface 111 to at least partially define said gap.

A4. Preferably the method of either one of clauses A1 and A2, further comprising removably sealing said second lower edge 127 relative to said tool surface 111.

A5. Preferably the method of any one of clauses A1 to A4, wherein said resin reservoir element 120 is located so as to extend along at least a majority of the length of a downstream edge of said composite preform 10.

A6. Preferably the method of any one of clauses A1 to A5, further comprising locating a resin flow control choke in said resin flow path 142 between said composite preform 10 and said resin reservoir 121.

A7. Preferably the method of any one of clauses A1 to A6, further comprising providing a second permeable flow media between said reservoir outlet 122 and a vacuum outlet port 113 extending from said tool surface 111 through said tool 110 to define a vacuum flow path 150, wherein said at least partial vacuum pressure is applied through said vacuum flow path 150.

B8. According to a further aspect of the present disclosure there is provided a method of forming a composite article, said method comprising:

resin infusing a composite preform 10 according to the method of any one of clauses A1 to A7 to form a resin infused composite preform; and curing said resin infused composite preform.

B9. Advantageously the method of clause B8, further comprising:

removing said resin reservoir element 120 from said tool surface 111 following curing of said resin infused composite preform; and removing excess resin collected in said resin reservoir 121 from said resin reservoir element 120.

C10. According to a yet further aspect of the present disclosure there is provided a resin infusion system 100 for resin infusing a composite preform 10, said system 100 comprising:

a tool 110 having an upper tool surface 111 receiving a composite preform 10 to be resin infused;

a resin supply 141;

a resin reservoir element 120 located on said tool surface 111 on a downstream side of said composite preform 10, said resin reservoir element 120 and said tool surface 111 defining a resin reservoir 121 having a reservoir outlet 122 and a reservoir inlet 123 located between said tool surface 111 and said reservoir outlet 122;

a vacuum bagging film 130 covering said composite preform 10 and said resin reservoir element 120 to define a sealed resin infusion chamber 140 between said vacuum bagging film 130 and said tool surface 111, said composite preform 10 and said resin reservoir element 120 being located in said resin infusion chamber 140;

a resin flow path 142 extending from said resin supply 141 to said resin infusion chamber 140 on an upstream side of said composite preform 10, through said composite preform 10 and through said reservoir inlet 123 to said resin reservoir 121; and a vacuum source 151 communicating with said reservoir outlet 122 via a vacuum flow path 150.

C11. Advantageously the system 100 of clause C10, wherein said resin reservoir element 120 comprises an elongate inverted channel section 124 having closed opposing ends 125.

C12. Advantageously the system 100 of clause C11, wherein said channel section 124 has a first lower edge 126 located toward said composite preform 10 and an opposing second lower edge 127 located away from said composite preform 10, said reservoir inlet 123 comprising a gap between said first lower edge 126 and said tool surface 111.

C13. Advantageously the system 100 of clause C12, further comprising a first permeable flow media located between said first lower edge 126 and said tool surface 111 to at least partially define said gap.

C14. Preferably the system 100 of either one of clauses C12 and C13, wherein said second lower edge 127 of said channel section 124 is removably sealed to said tool surface 111.

C15. Preferably the system 100 of any one of clauses C11 to C14, wherein said channel section 124 has a generally semi-circular cross-section.

C16. Preferably the system 100 of any one of clauses C10 to C15, wherein said reservoir outlet 122 is located at or adjacent an uppermost portion of said resin reservoir element 120.

C17. The system 100 of any one of clauses C10 to C16, wherein said resin reservoir element 120 extends along at least a majority of the length of a downstream edge of said composite preform 10.

C18. The system 100 of any one of clauses C10 to C17, further comprising a permeable resin flow control choke located in said resin flow path 142 between said composite preform 10 and said resin reservoir 121.

C19. The system 100 of any one of clauses C10 to C18, wherein said vacuum flow path 150 extends through a vacuum outlet port 113 extending from said tool surface 111 through said tool 110, said apparatus further comprising a second permeable flow media extending from said reservoir outlet 122 to said vacuum outlet port 113, said vacuum bagging film 130 extending over said second permeable flow media and said vacuum outlet port 113.

C20. The system 100 of any one of clauses C10 to C19, comprising a plurality of said reservoir outlets 122 spaced along said resin reservoir element 120.

Persons skilled in the art will appreciate that the above specific embodiments described above are merely examples of the present disclosure. Persons skilled in the art will appreciate that the various features described in relation to different embodiments may be used in combination or as alternatives. Persons skilled in the art will also appreciate various other modifications and alternatives to the embodiments described.

What is claimed is:

1. A resin infusion system for resin infusing a composite preform, said system comprising:
    a tool having an upper tool surface receiving a composite preform to be resin infused;
    a resin supply;
    a resin reservoir element located on said tool surface on a downstream side of said composite preform and comprising an elongate inverted channel section having closed opposing ends, said resin reservoir element and said tool surface defining a resin reservoir having a reservoir outlet located adjacent an uppermost portion of said resin reservoir element and a reservoir inlet located between said tool surface and said reservoir outlet;
    a vacuum bagging film covering said composite preform and said resin reservoir element to define a sealed resin infusion chamber between said vacuum bagging film and said tool surface, said composite preform and said resin reservoir element being located in said resin infusion chamber;
    a resin flow path extending from said resin supply to said resin infusion chamber on an upstream side of said composite preform, through said composite preform and through said reservoir inlet to said resin reservoir;
    a first permeable flow media extending from said reservoir inlet toward said composite preform and forming a part of the resin flow path;
    a second permeable flow media extending from said resin supply, over said composite preform, and toward said resin reservoir and forming a part of the resin flow path; and
    a vacuum source communicating with said reservoir outlet via a vacuum flow path, wherein said vacuum flow path extends through a vacuum outlet port extending from said tool surface through said tool, said system further comprising a third permeable flow media extending from said reservoir outlet to said vacuum outlet port, said vacuum bagging film extending over said third permeable flow media and said vacuum outlet port.

2. The system of claim 1, wherein said channel section has a first lower edge located toward said composite preform and an opposing second lower edge located away from said composite preform, said reservoir inlet comprising a first gap between said first lower edge and said tool surface.

3. The system of claim 2, wherein the first permeable flow media is located between said first lower edge and said tool surface to at least partially define said first gap.

4. The system of claim 2, wherein said second lower edge of said channel section is removably sealed to said tool surface.

5. The system of claim 1, wherein said channel section has a generally semi-circular cross-section.

6. The system of claim 1, wherein said resin reservoir element extends along at least a majority of a length of a downstream edge of said composite preform.

7. The system of claim 1, comprising a plurality of said reservoir outlets spaced along said resin reservoir element.

8. The system of claim 1, further comprising a resin flow control choke restricting said resin flow path and in between said first permeable flow media and said second permeable flow media located between said composite preform and said resin reservoir.

9. A resin infusion system for resin infusing a composite preform, said system comprising:
    a tool having an upper tool surface receiving a composite preform to be resin infused;
    a resin supply;
    a resin reservoir element located on said tool surface on a downstream side of said composite preform, said resin reservoir element and said tool surface defining a resin reservoir having a reservoir outlet and a reservoir inlet located between said tool surface and said reservoir outlet, said resin reservoir element having a first lower edge located toward said composite preform and an opposing second lower edge located away from said composite preform, said reservoir inlet comprising a first gap between said first lower edge and said tool surface;
    a vacuum bagging film covering said composite preform and said resin reservoir element to define a sealed resin infusion chamber between said vacuum bagging film and said tool surface, said composite preform and said resin reservoir element being located in said resin infusion chamber;
    a resin flow path extending from said resin supply to said resin infusion chamber on an upstream side of said composite preform, through said composite preform and through said reservoir inlet to said resin reservoir;
    a first permeable flow media extending from said reservoir inlet toward said composite preform and forming a part of the resin flow path;
    a second permeable flow media extending from said resin supply, over said composite preform, and toward said resin reservoir and forming a part of the resin flow path; and
    a vacuum source communicating with said reservoir outlet via a vacuum flow path wherein said vacuum flow path extends through a vacuum outlet port extending from said tool surface through said tool, said system further comprising a third permeable flow media extending from said reservoir outlet to said vacuum outlet port, said vacuum bagging film extending over said third permeable flow media and said vacuum outlet port.

10. The system of claim 9, wherein the first permeable flow media is located between said first lower edge and said tool surface to at least partially define said first gap.

11. The system of claim 9, wherein said second lower edge of said resin reservoir element is removably sealed to said tool surface.

12. The system of claim 9, wherein said resin reservoir element is an elongate inverted channel section having closed opposing ends and a generally semi-circular cross section.

13. The system of claim 12, wherein said closed opposing ends are formed from multiple pieces of sealing tape.

14. The system of claim 9, further comprising a resin flow control choke restricting said resin flow path and defined by a second gap between said first permeable flow media and said second permeable flow media located between said composite preform and said resin reservoir.

15. The system of claim 9, wherein said resin reservoir element extends along at least a majority of a length of a downstream edge of said composite preform.

16. A resin infusion system for resin infusing a composite preform, said system comprising:
- a tool having an upper tool surface receiving a composite preform to be resin infused;
- a resin supply;
- a resin reservoir element located on said tool surface on a downstream side of said composite preform, said resin reservoir element and said tool surface defining a resin reservoir having a reservoir outlet and a reservoir inlet located between said tool surface and said reservoir outlet;
- a vacuum bagging film covering said composite preform and said resin reservoir element to define a sealed resin infusion chamber between said vacuum bagging film and said tool surface, said composite preform and said resin reservoir element being located in said resin infusion chamber;
- a resin flow path extending from said resin supply to said resin infusion chamber on an upstream side of said composite preform, through said composite preform and through said reservoir inlet to said resin reservoir;
- a first permeable flow media extending from said reservoir inlet toward said composite preform and forming a part of the resin flow path;
- a second permeable flow media extending from said resin supply, over said composite preform, and toward said resin reservoir and forming a part of the resin flow path; and
- a vacuum source communicating with said reservoir outlet via a vacuum flow path wherein said vacuum flow path extends through a vacuum outlet port extending from said tool surface through said tool, said system further comprising a third permeable flow media extending from said reservoir outlet to said vacuum outlet port, said vacuum bagging film extending over said third permeable flow media and said vacuum outlet port.

17. The system of claim 16, wherein said resin reservoir element further comprising an elongate inverted channel section having a first lower edge located toward said composite preform and an opposing second lower edge located away from said composite preform, said reservoir inlet comprising a first gap between said first lower edge and said tool surface.

18. The system of claim 16, further comprising a second vacuum bagging film covering said vacuum bagging film, wherein a vacuum can be applied to said second vacuum bagging film.

19. The system of claim 17, wherein the first permeable flow media is located between and said tool surface to at least partially define said first gap.

20. The system of claim 16, further comprising a resin flow control choke restricting said resin flow path and in between said first permeable flow media and said second permeable flow media located between said composite preform and said resin reservoir.

* * * * *